(12) United States Patent
Smith et al.

(10) Patent No.: US 6,844,637 B1
(45) Date of Patent: Jan. 18, 2005

(54) ROTOR ASSEMBLY END TURN COOLING SYSTEM AND METHOD

(75) Inventors: Matthew Bertram Smith, Leechburg, PA (US); Robert Joseph Budenholzer, Monroeville, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 0 days.

(21) Appl. No.: 10/641,209

(22) Filed: Aug. 13, 2003

(51) Int. Cl.$^7$ ................................................ H02K 9/00
(52) U.S. Cl. .......................................... 310/54; 310/59
(58) Field of Search ........................ 310/52–59, 61–63, 310/261, 270

(56) References Cited

U.S. PATENT DOCUMENTS

| | | | |
|---|---|---|---|
| 2,786,951 A | | 3/1957 | Morgan |
| 2,833,944 A | | 5/1958 | Willyoung |
| 3,908,140 A | * | 9/1975 | Fidei et al. .................... 310/54 |
| 4,286,183 A | * | 8/1981 | Montgomery ................. 310/62 |
| 4,379,975 A | * | 4/1983 | Kitajima ....................... 310/59 |
| 4,543,503 A | | 9/1985 | Kaminski et al. |
| 4,654,550 A | * | 3/1987 | Lowther et al. ............... 310/59 |
| 4,682,064 A | * | 7/1987 | Crounse et al. ............... 310/61 |
| 4,709,177 A | | 11/1987 | Kaminski |
| 4,814,655 A | | 3/1989 | Kaminski |
| 4,922,147 A | | 5/1990 | Sismour, Jr. et al. |
| 5,483,112 A | | 1/1996 | Biseli et al. |
| 5,777,406 A | | 7/1998 | Bomba et al. |
| 5,894,178 A | * | 4/1999 | Stefan ......................... 310/61 |
| 6,087,745 A | | 7/2000 | Dreher |
| 6,147,586 A | | 11/2000 | Saitoh et al. |
| 6,194,807 B1 | | 2/2001 | Kaminski et al. |
| 6,204,580 B1 | | 3/2001 | Kazmierczak |
| 6,252,318 B1 | | 6/2001 | Kazmierczak |
| 6,339,268 B1 | | 1/2002 | Kaminski et al. |

* cited by examiner

*Primary Examiner*—Thanh Lam
(74) *Attorney, Agent, or Firm*—Reed Smith (57) ABSTRACT

A rotor assembly end turn cooling system and method in which cooling fluid is introduced at both ends of each cooling fluid passageway and at various points therebetween and spent cooling fluid is exhausted through exhaust openings disposed at various points between the ends of each cooling fluid passageway, including near the end turn corners. Multi-layered bore baffle shells and/or helical exhaust ducts having multiple channels control the flow of cooling fluid through the passageways and into axial rotor slots for expulsion into the rotor-stator gap. Each duct or channel may increase in cross-sectional area in the flow direction to maintain constant fluid flow velocity in the duct or channel. Improved end turn cooling and reduced cooling fluid temperatures maintain more consistent temperatures in the end turns and reduce the maximum hot-spot temperature to provide greater generator power densities and longer rotor coil insulation life.

31 Claims, 10 Drawing Sheets

ROTOR ASSEMBLY END TURN COOLING SYSTEM AND METHOD

The U.S. Government has a paid-up license in this invention and the right in limited circumstances to require the patent owner to license others on reasonable terms as provided for by the terms of Contract No. N00024-01-C-4010 awarded by the United States Navy's Naval Sea Systems Command (NAVSEA).

BACKGROUND OF THE INVENTION

1. Field of the Invention

This invention relates to large electrodynamic machines, such as electrical motors and generators and, more specifically, to a rotor assembly end turn cooling system and method for cooling the end turn region of coil-wound rotor assemblies in gas-cooled electrical generators.

2. Description of the Related Art

Large gas-cooled electrical generators are designed to have the highest power density possible while also being simple to manufacture. As the power density of an electrical generator increases, however, more heat is produced in the stator and rotor windings during normal operation. The need to conduct waste heat away from the stator and rotor windings thus operates as a significant constraint to the power densities that can be achieved.

Figure 1:
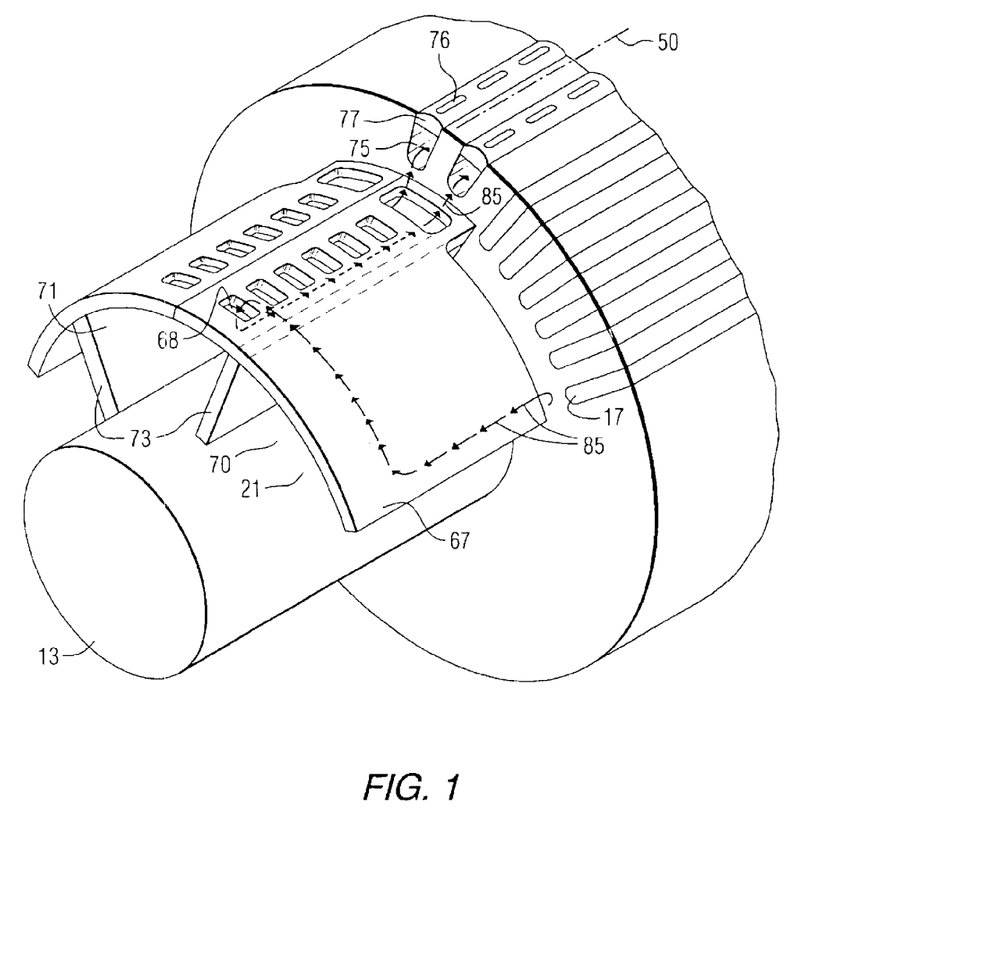
FIG. 1 is a partial perspective view of a conventional rotor assembly end turn cooling system for an electrical generator with the end turns removed to show the air flow pattern thereof.
Figure 2:
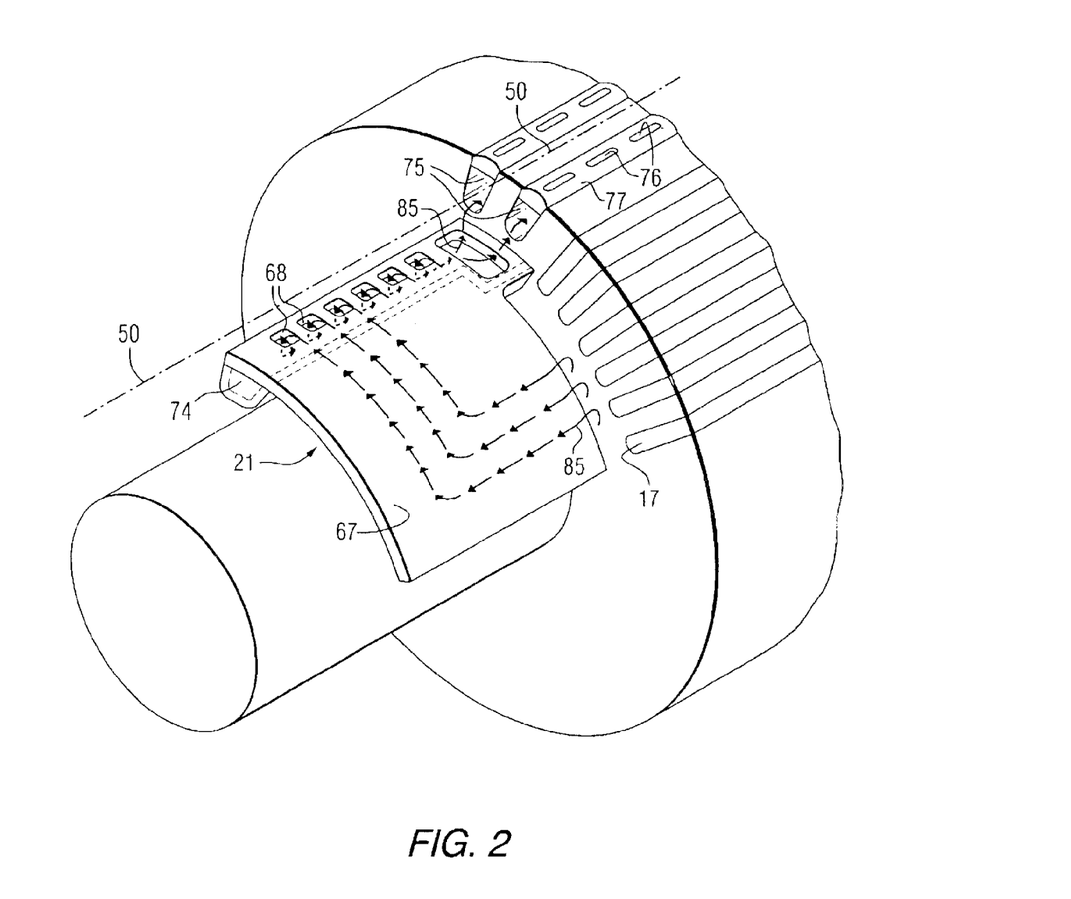
FIG. 2 is a partial perspective view of another conventional rotor assembly end turn cooling system for an electrical generator with the end turns removed to show the air flow pattern thereof.

Traditionally, the end turn regions of strap-wound rotor windings have been difficult to effectively cool. Examples of the present state of the art are shown in FIGS. 1 and 2 wherein the end turns and cooling passages are not shown so as to simplify illustration inasmuch as such structures are known to those skilled in the art. In current end turn cooling designs, the cooling fluid, for example air or hydrogen, is drawn over a cylindrical baffle shell 67 as shown by arrows 85 into cooling fluid passages (not shown) between end turns (not shown) from the high pressure zones 70 (source zones) comprising part of the annular space 21 between the baffle shell 67 and the rotor shaft extension 13. After being drawn through the cooling passages in or around the end turns (not shown), the cooling fluid is drawn radially inwardly through exhaust openings 68 into either low pressure zones 71 (suction zones, see FIG. 1) or axial, low-pressure ducts 74 (FIG. 2). On its journey from the source zone 70, over the shell 67 through the end turns and into suction zone 71 or low-pressure duct 74, the cooling fluid may pass along the sides of the coil end turns through ventilation channels (not shown) cut into fiberglass blocking (not shown) located between the coil end turns, through passageways designed within each copper coil, or through "zig-zag" slots cut at angles through a stack of copper coils.

From either the low pressure zone 71 or axial duct 74, the cooling fluid is then directed into the rotor pole slots 75 and pumped out into the rotor-stator air gap either directly or when slot covers 77 are used, through openings 76 therein.

The blocks 73 (FIG. 1) that form the barriers between the high pressure zones 70 and low pressure zones 71 are typically difficult to fit, as the fit must be tight enough to minimize leaks while leaving sufficient clearances for assembly. Normally, grooves are machined into the surface of the rotor shaft extension 13 to locate the blocks 73, adding cost and complexity to the rotor design. Sealing the low pressure zones 71 on the face toward the end of the rotor requires additional end-cap blocks (not shown) that must be attached to the rotor end ring, requiring that stress-concentrating holes be included in the rotor end ring design. The wall blocks 73 also require fasteners and other attaching/locating/sealing hardware, all of which add to the cost and reduce the reliability of the overall generator design.

As shown in FIGS. 1–2, the prior art end turn cooling devices provide only limited locations for the inlet and exhaust of cooling fluid to and from the end turn cooling passages. Exhaust must occur either into the narrow low-pressure zones 71 formed by the cylindrical shell 67 and wall blocks 73, or into simple axial ducts 74 defined by the underside of the shell 67. Both the low pressure zones 71 and the linear ducts 74 have traditionally been limited to locations along the centerline 50 of the rotor assembly to match up with the pole slots 75.

It would be desirable, therefore, to provide a rotor assembly end turn cooling system and method in which wall blocks are not used to divide the annular space between the cylindrical shell and the rotor shaft extension into high and low pressure zones.

It would be desirable further to provide a rotor assembly end turn cooling system and method where cooling fluid enters each cooling passage at a plurality of locations and spent cooling fluid is exhausted from the passages through openings located in close proximity to the corners of the end turns to enhance cooling of the end turns by providing shorter cooling passages to be traversed by the cooling fluid.

It would be desirable further to provide a rotor assembly end turn cooling system employing a generally cylindrical baffle shell having helical exhaust ducts that allow spent cooling fluid to be exhausted from the passages through openings located in close proximity to the corners of the coil end turns to allow the use of the shorter cooling fluid passages.

Moreover, it would also be desirable to provide a rotor assembly end turn cooling system wherein each helical exhaust duct has a plurality of exhaust channels to control the amount of suction directed to each passageway or section thereof to control the rate of fluid flow therethrough.

It would be desirable additionally to provide a rotor assembly end turn cooling system wherein the size, depth and cross-section of each channel of the helical exhaust duct is selected to provide constant velocity of the spent cooling fluid along the length of the helical exhaust duct to reduce fluid flow resistance and thereby further improve the cooling of the end turns.

Further still, it would be desirable to provide a rotor assembly end turn cooling system that allows cooling fluid inlet and exhaust openings to be positioned at any desired locations along the cooling fluid passages disposed among the coil end turns.

Additionally, it would be desirable to provide a rotor assembly end turn cooling system having a baffle shell with a smooth inner surface to minimize gas pressure variation and flow disturbances within the annular space between the baffle shell and the rotor shaft extension.

The present invention in its various preferred embodiments described herein provides numerous improvements and benefits over the prior art rotor assembly end turn cooling systems and methods.

SUMMARY OF THE INVENTION

Accordingly, the present invention provides an improved rotor assembly end turn cooling system and method for cooling the end turn region of rotor coils in an electrical generator that does not employ wall blocks to divide the annular space between the cylindrical shell and the rotor shaft extension into high and low pressure zones.

In the improved rotor assembly end turn cooling system and method of the present invention, cooling fluid enters each cooling passage at a plurality of locations, preferably near each end of each passage, and spent cooling fluid is exhausted from the passage through openings located in close proximity to the corners of the end turns. The present invention thereby provides for shorter cooling passages to be traversed by the cooling fluid which improves the cooling of the end turns.

The improved rotor assembly end turn cooling system of the present invention employs a generally cylindrical bore baffle shell having helical exhaust ducts to collect the spent cooling fluid from exhaust openings located in close proximity to the corners of the coil end turns that allow for the use of the shorter cooling fluid passages. In addition, each helical exhaust duct preferably comprises a plurality of exhaust channels which provides for the fine control of suction directed to each cooling fluid passageway. The size, depth and cross-section of each channel is selected to provide for the constant velocity of the spent cooling fluid along the length of the helical exhaust duct to further improve the cooling of the coil end turns.

The improved rotor assembly end turn cooling system of the present invention may alternatively employ a generally cylindrical baffle shell comprising a plurality of layers wherein an outer layer of the plurality of layers defines a plurality of cooling fluid exhaust openings in fluid communication with an exhaust duct defined by an inner layer of the plurality of layers. The multi-layered baffle shell of the improved rotor assembly end turn cooling system of the present invention allows cooling fluid inlet and exhaust openings to be positioned at any desired location, including near the corners of the end turns, along the cooling fluid passages.

Other and further features and advantages of the invention will appear more fully from the following description.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description of the present invention and the preferred embodiment(s) thereof is set forth in detail below with reference to the attached drawings.

Figure 3:
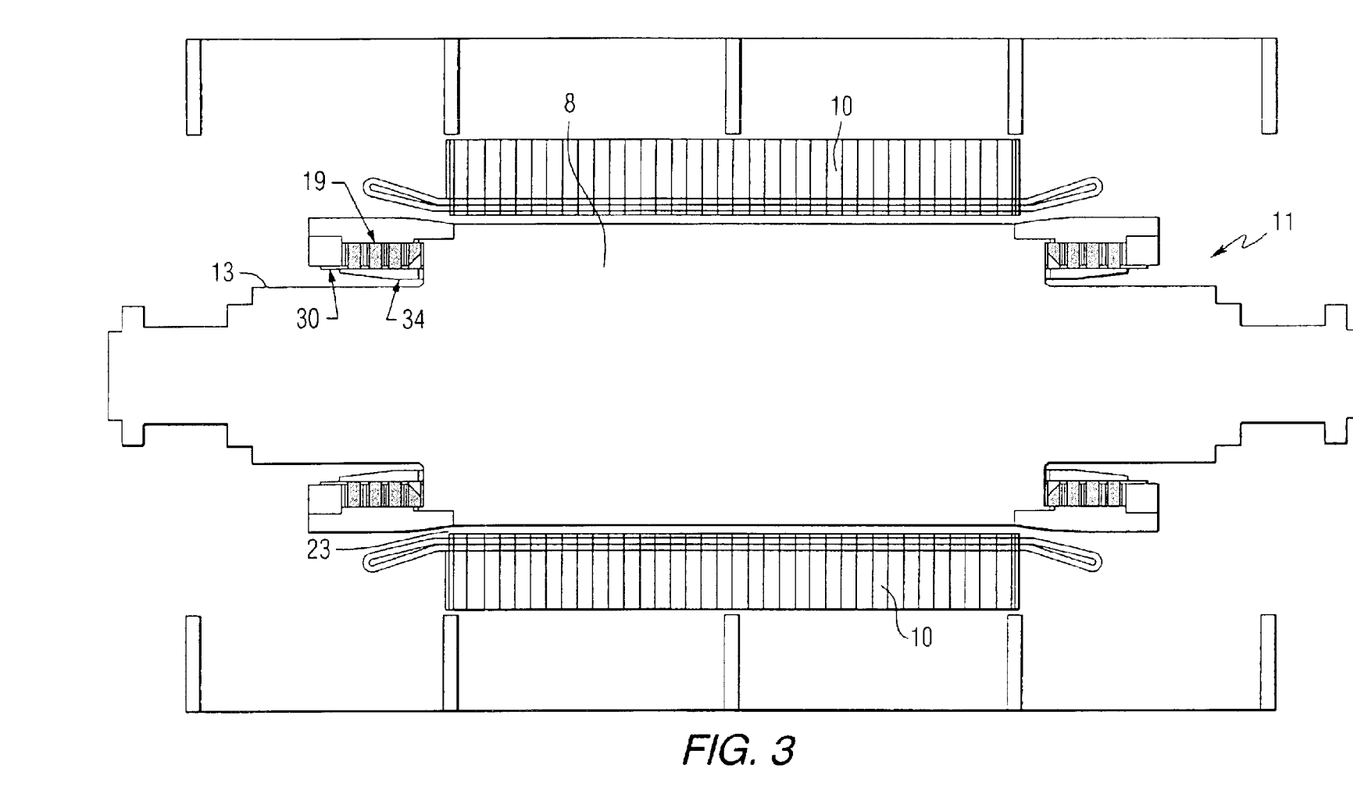
FIG. 3 is a cross-sectional view of a preferred embodiment of a rotor assembly end turn cooling system according to the present invention.

Referring now to the drawings, wherein like reference numerals designate corresponding structure throughout the views, a preferred embodiment of the rotor assembly end turn cooling system of the present invention is illustrated in FIGS. 3–8. Referring to FIG. 3, shown therein is the rotor assembly 11 disposed within the stator assembly 10. The rotor assembly 11 comprises an intermediate rotor portion 8 and the rotor shaft extension 13. The improved end turn cooling system of the rotor assembly 11 according to the present invention is shown in cross-section in FIG. 3 and in more detail in FIGS. 4–8.

Figure 4:
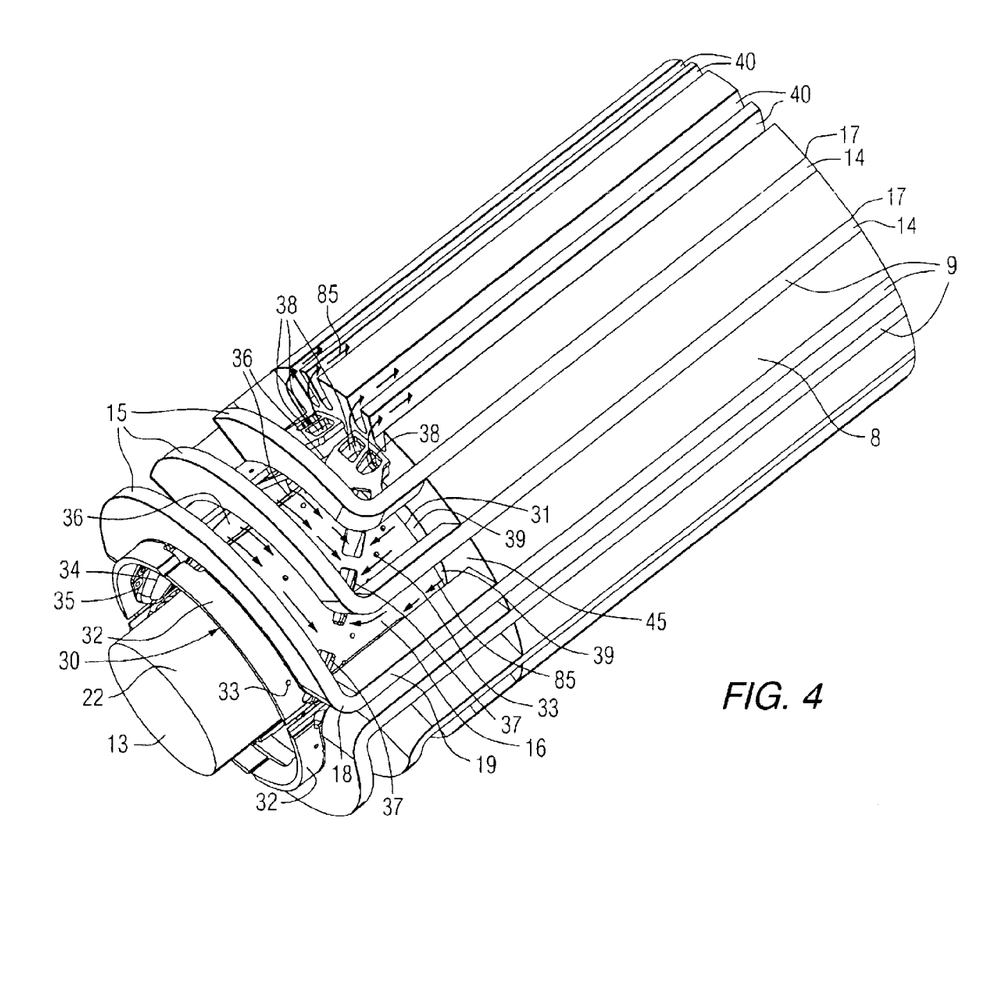
FIG. 4 is a partial top perspective view of a portion of the rotor assembly end turn cooling system of FIG. 3.

As shown in FIG. 4, each of the rotor coils 9 comprises a pair of axial members 14 disposed in coil slots 17 and a pair of transverse members 15 which meet at corners or intersections 18. The inside portion of each intersection 18 is generally concave while the outer portion thereof is generally convex. The portion of each coil 9 referred to as the end turn 19 comprises the transverse member 15, intersections 18 and the parts of axial members 14 that extend beyond the face 45 of intermediate rotor portion 8. A retaining ring (not shown) is typically fit over the outside diameter of the end turns 19 to contain and support the coils 9. As shown more clearly in FIG. 6, an annular space 21 is defined between the outer surface 22 of the rotor shaft extension 13 and the nested end turns 19 of the coils 9.

Figure 7:
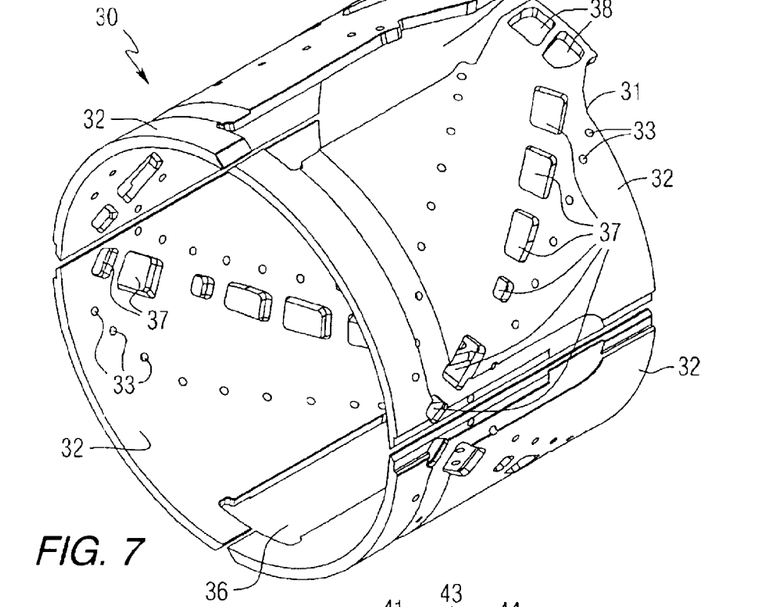
FIG. 7 is a perspective view of a preferred embodiment of a bore baffle shell of the rotor assembly end turn cooling system of FIG. 3.
Figure 8:
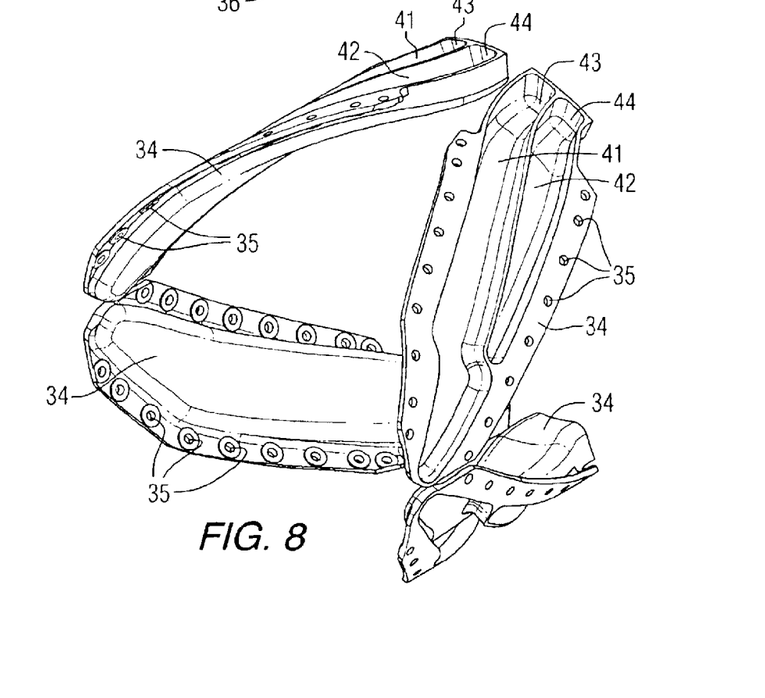
FIG. 8 is a perspective view of a preferred embodiment of the helical collecting ducts for assembly with the bore baffle shell of FIG. 7.

Bore baffle shell 30 is disposed in the annular space 21, preferably adjacent to the inner surface of the end turns 19 of the coils 9. As shown in FIGS. 7 and 8, the baffle shell 30 comprises a plurality of sections 32 which form a substantially cylindrical shell. Each section 32 defines openings 33 for the attachment of the helical ducts 34 via openings 35 therein. The helical ducts, however, may preferably be integrally formed as part of the baffle shell 30. As shown in FIG. 4, the helical ducts 34 are preferably disposed on the inner surfaces of the baffle sections 32.

The baffle sections 32 also define exhaust openings 37 in fluid communication with helical ducts 34 for channeling the spent cooling fluid out of the passageways 16 disposed between successive end turns 19 through ports 38 into the axial pole slots 40 as shown by arrows 85 in FIG. 4. The pole slots 40 are defined by the intermediate rotor portion 8. The cooling fluid is exhausted from the pole slots 40 into the rotor/stator gap 23 (FIG. 3). The ports 38 are defined by the baffle sections 32, which also define cooling fluid inlet openings or slots 36. Additional cooling fluid inlet slots 39 are located between the edge 31 of each baffle section 32 and the face 45 of the intermediate rotor portion 8 to which each baffle section 32 preferably is attached.

As shown in FIG. B, each of the helical ducts 34 preferably comprises a plurality of channels 41, 42 having outlet openings 43 and 44, respectively. One of the primary reasons for employing the plurality of channels 41 and 42 is to control the amount of suction directed to each exhaust opening 37 and thereby control the rate of fluid flow through a given section of a passageway 16. For example, where it is desired to increase the fluid flow in a section of a passageway 16, the volumetric flow capacity of the channel 41 or 42 servicing an exhaust opening 37 in such section would be increased to provide more suction when the rotor is rotated. The depth, width and cross-section of each channel 41, 42 may also be selected so that the cross-sectional area thereof increases in the direction towards the outlet openings 43, 44 adjacent the intermediate rotor portion 8. This preferred configuration of channels 41, 42 provides for the constant velocity of the spent cooling fluid as it travels through the channels 41, 42 of ducts 34 to reduce resistance to fluid flow and thereby further improve the cooling of the end turns 19.

Figure 5:
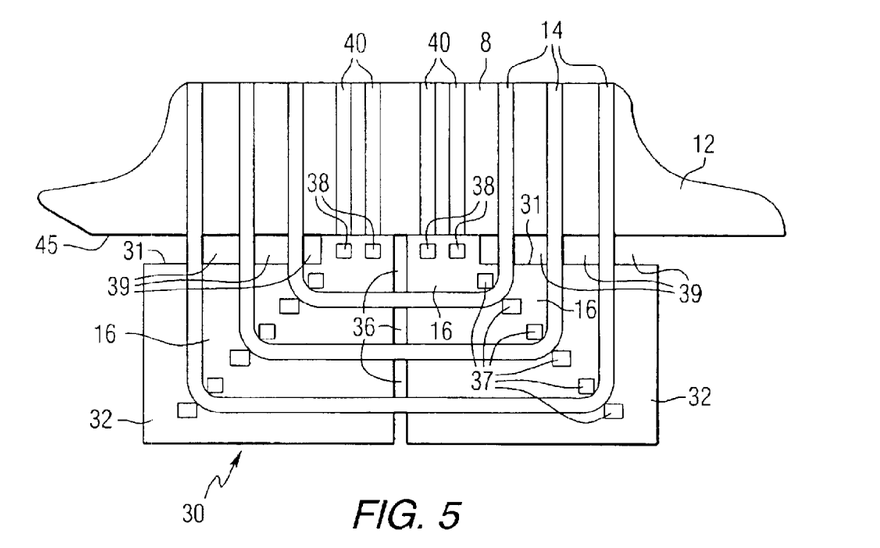
FIG. 5 is a partial top plan view of various components of the rotor assembly end turn cooling system of FIG. 3.
Figure 6:
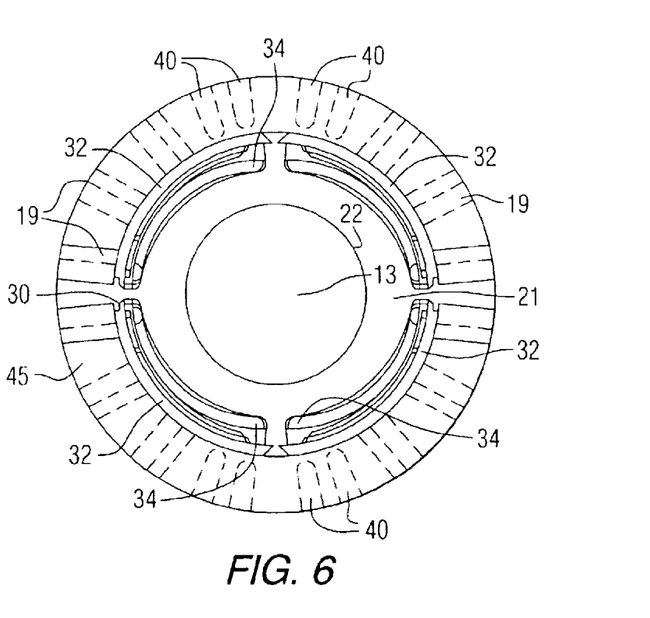
FIG. 6 is an end view of the rotor assembly end turn cooling system of FIG. 3.

As shown in FIGS. 4 and 5, each passageway 16 between successive coil end turns 19 has a first inlet 36 and a second inlet 39 through which cooling fluid may be drawn from the annular space 21, as shown by arrows 85, when the rotor assembly 11 is rotated. Also, the length of the passageway 16 that the cooling fluid travels prior to exiting the passageway 16 is reduced due to the placement of the exhaust openings 37. Preferably, exhaust openings 37 are located near the concave and convex sides of each corner 18. At least one, and preferably two, exhaust openings 37, therefore, are located about mid-way through each passageway 16.

As described herein, the rotor assembly 11 of the present invention provides a means for directing generator end turn cooling fluid from the rotor coil corners 18 to the rotor pole slots 40. Directing the fluid in this manner allows cooling fluid to enter the end turn cooling passages 16 both from inlets 36 located at the centerline 50 of the rotor assembly 11 and from the slots 39 where the coils 9 emerge from the intermediate rotor portion 8. After entering the passages 16 from inlets 36 and 39, the cooling fluid may flow through ventilation channels cut into fiberglass blocking (not shown) disposed along the sides of the coils 9, or through passages (not shown) in the end turns themselves, either along their length or cut in a "zig-zag" pattern through the stack of coils. The ingestion of cooling fluid at two points 36, 39 and the shorter paths traversed by the fluid enhance cooling of the end turns 19 of the coils 9.

The use of shorter cooling passages 16 in the rotor assembly end turn cooling system and method of the present invention reduces gas temperature increases in the cooling fluid to maintain more consistent temperatures over the length of the rotor coil end turns 19. This more consistent temperature distribution reduces the maximum hot-spot temperature of any given coil 9. This maximum hot-spot temperature is a critical factor balancing the power generation capability of the machine with the expected life of the electrical insulation within the rotor coils 9. Thus, the present invention provides for an increase in the power density of the generator and/or an increase in the expected life of the rotor coil insulation.

Another preferred embodiment of the rotor assembly end turn cooling system of the present invention is illustrated in FIGS. 9–12. In this preferred embodiment, the bore baffle shell 80 is a multi-layered shell comprising layers 90 and 91. Only a quarter section 82 of the multi-layered shell 80 is shown in FIGS. 9–12. To suit manufacturing or assembly requirements, the shell 80 could be fabricated in any number of sections 82 of various shapes. When assembled, the shell 80 comprising sections 82 covers a majority of the inner surfaces of the coil end turns 19. The outer diameter of the shell 80 preferably rests against the inner surfaces of the end turns 19. The inner surface of the innermost layer 91 of the baffle shell 80 preferably is smooth to reduce turbulence within the annular space 21 when the rotor assembly is rotated.

As in the first preferred embodiment of the present invention, the annular space 21 comprises a high-pressure or source zone for supplying cooling fluid. In addition to cooling fluid inlets 36 and 39, inlet openings 84, which pass through each the layers 90 and 91, can be provided at any desired location on the baffle shell 80 to allow cooling fluid from the annular space 21 to enter the cooling passages 16 as shown by arrows 85 in FIG. 9. In this manner, the end turn cooling system of this second preferred embodiment can provide two or more cooling fluid inlets 84 in any of the cooling fluid passages 16 or in any other cooling fluid passages (not shown) defined inside the coils 9, either along their length or cut in a "zig-zag" pattern through a stack of coils.

After traveling through the passages 16, the cooling fluid exits through exhaust openings 88 in the outer layer 90 of baffle shell 80. The exhaust openings 88 lead into exhaust ducts 89 defined in the second layer 91 of baffle shell 80 that conduct the hot exhaust fluid out of the shell 80 through their ends 94 which communicate with outlet ports 95. The exhaust ducts 89 are enclosed by the outer layer 90 and may preferably comprise any shape necessary to collect the spent cooling fluid from each of the exhaust openings 88. The depth, width and cross-section of each portion of the exhaust ducts 89 preferably are selected so that the cross-sectional area increases from each entry point of spent cooling fluid from an exhaust opening 88 towards the exhaust ports 95. Again, this preferred configuration of the exhaust ducts 89 provides for the constant velocity of the spent cooling fluid as it travels therethrough which reduces resistance to fluid flow and thereby further improves the cooling of the end turns 19. The depth, width and cross-section of each portion of the exhaust ducts 89 preferably may also be configured to control the amount of suction directed to each exhaust opening 88 and thereby control the volume of fluid in a given section of a passageway 16. For example, where it is desired to increase the fluid flow in a section of a passage 16, the volumetric flow capacity of the exhaust duct 89 servicing an exhaust opening 88 in such section would be increased to provide more suction when the rotor is rotated.

Figure 9:
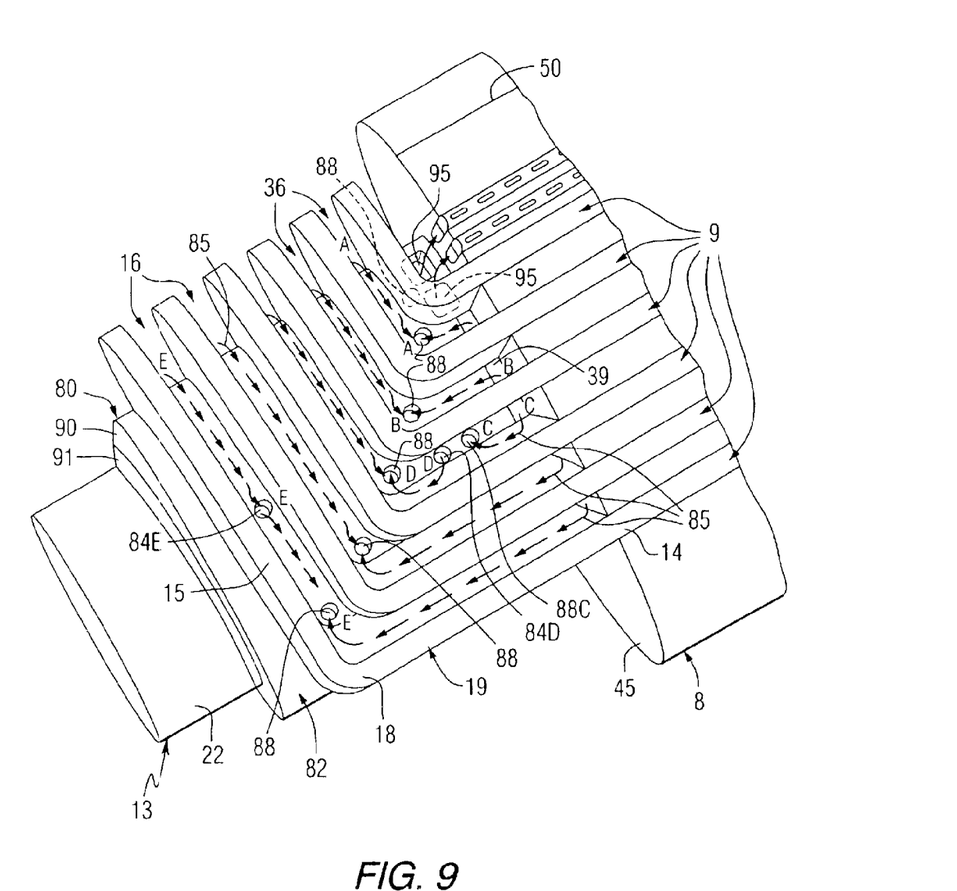
FIG. 9 is an isometric view of part of another preferred embodiment of a rotor assembly end turn cooling system having a multi-layered bore baffle shell according to the present invention.
Figure 10:
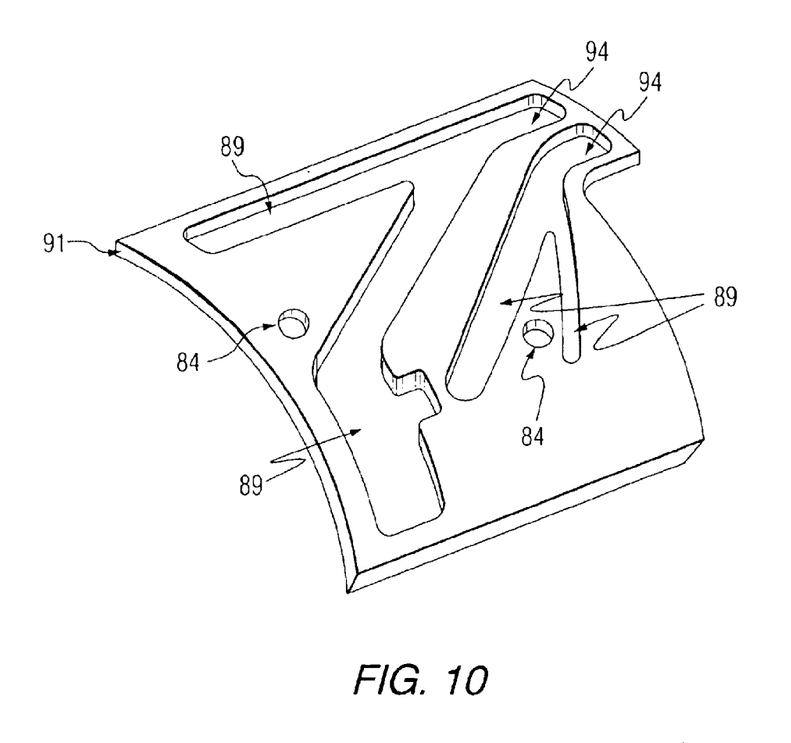
FIG. 10 is an isometric view of one of the layers of a section of the multi-layered bore baffle shell of the rotor assembly end turn cooling system of FIG. 9.

FIG. 9 shows various preferred airflow paths through the passages 16 via arrows 85 to provide examples of some of the complex airflow patterns that may be achieved in the end turn cooling system of the present invention. Along path A—A, cooling fluid enters the passage 16 from inlet 36 between shell sections 82 at the pole centerline 50 and is exhausted into exhaust opening 88 at the corner 18 of the coil end turn 19, Along path B—B, cooling fluid enters the passage 16 from inlet 39 between shell section 82 and face 45 of the intermediate rotor portion 8 and exits into an exhaust opening 88 at the corner 18 of the coil end turn 19.

Along path C—C, cooling fluid enters the passage 16 from inlet 39 between shell section 82 and face 45 of the intermediate rotor portion 8 and a portion of that fluid exits through the exhaust opening 88C located away from the corner 18 towards inlet 39. Path D—D is located in the same passage 16 where cooling fluid enters the passage 16 from inlet opening 84D located at a point along the axial portion 14 of the coil 9 and exits via the exhaust opening 88 located at the corner 18 of the coil end turn 19.

Along path E—E—E, cooling fluid is admitted into the passage 16 from inlet 36 along the pole centerline 50, with additional cooling fluid entering from inlet opening 84E located midway along the transverse portion 15 of the coil 9. The cooling fluid from these two inlets then exits via exhaust opening 88 located at the corner 18 of the coil end turn 19.

Many other flow paths or combinations are also possible with the multi-layered baffle 80 of this preferred embodiment. For example, while only a two-layer baffle shell 80 is depicted herein, additional and more complex air flow inlet and exhaust patterns may be achieved by using a baffle shell 80 having more than two layers, with cooling fluid inlets, outlets and ducts defined therein to direct fluid flow as desired. Such an arrangement would allow two or more exhaust ducts, such as exhaust duct 89, to cross each other at different levels within the baffle shell 80, as desired. Such an arrangement would also allow inlet ducts, similar to exhaust ducts 89, to be formed in intermediate layers of the baffle shell 80 to provide additional cooling fluid inlet routings more complex than the inlets 36, 39 and 84 shown in the drawings.

Figure 11:
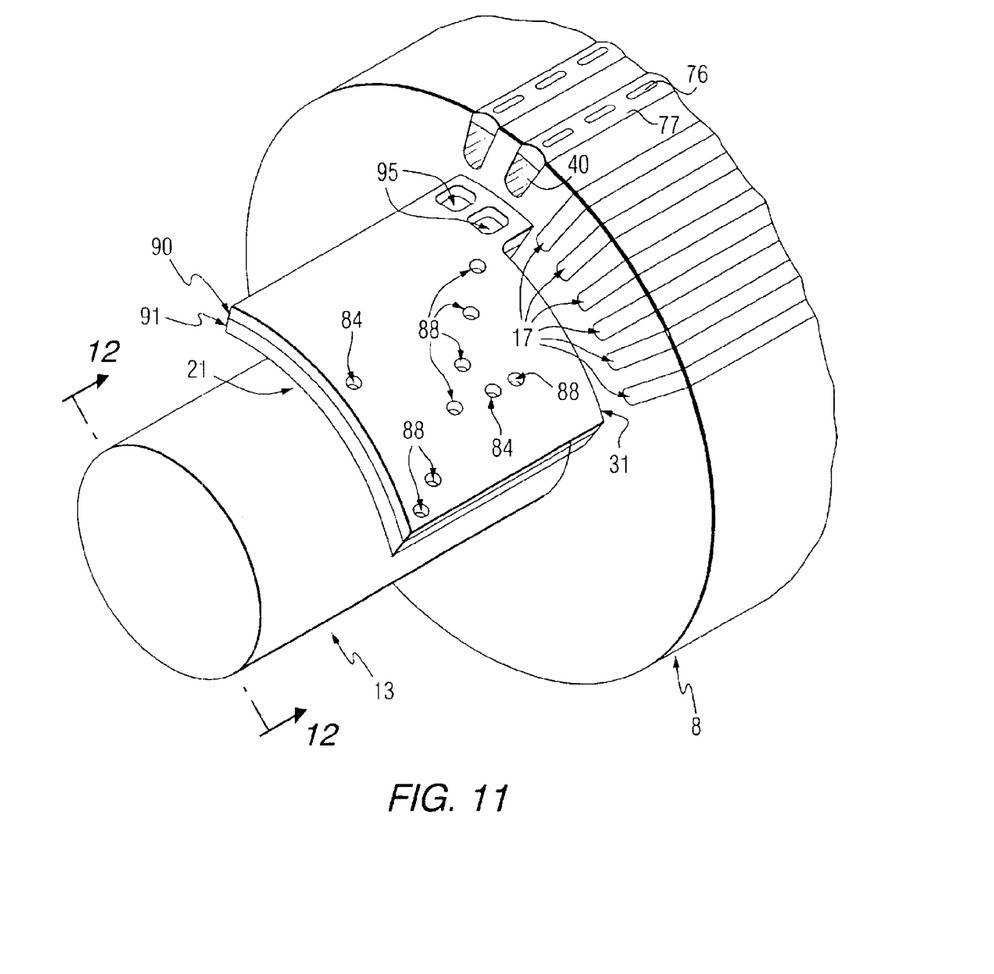
FIG. 11 is an isometric view of the part of the rotor assembly end turn cooling system of FIG. 9 with the coil end turns removed to more clearly show the multi-layered bore baffle shell.
Figure 12:
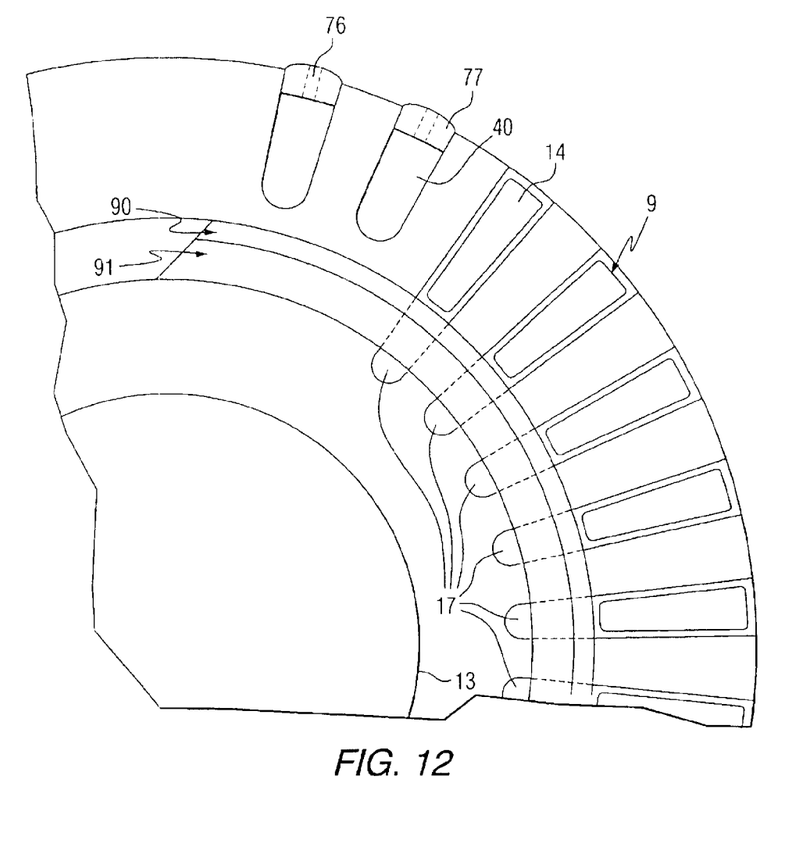
FIG. 12 is a partial end view of the rotor assembly end turn cooling system of FIG. 11, again with the coil end turns removed for clarity.

In either preferred embodiment of the rotor assembly end turn cooling system of the present invention, the edges 31 of the bore baffle shells 30 or 80 preferably are held away from the face 45 of the intermediate rotor portion 8 as shown in FIGS. 5 and 11 to allow cooling fluid to enter the cooling passages 16 and the rotor body cooling passages 17 (FIG. 12) under the axial portions 14 of coils 9. The edges 31 preferably may also be angled or chamfered to allow even greater airflow into the cooling passages 17.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A rotor assembly comprising:
   a rotor shaft having an intermediate portion and a rotor shaft extension of a reduced diameter with respect to said intermediate portion;
   a baffle shell disposed in an annular space defined between said rotor shaft extension and a plurality of end turns of a plurality of coils of said rotor assembly, wherein said baffle shell has an outer surface defining a plurality of cooling fluid exhaust openings, each of said cooling fluid exhaust openings being in fluid communication with a substantially helical exhaust duct disposed on or integrally formed with said baffle shell.

2. The rotor assembly of claim 1 wherein said baffle shell is substantially in the shape of a hollow cylinder.

3. The rotor assembly of claim 1 wherein said substantially helical exhaust duct is in fluid communication with an axial slot defined by said intermediate portion of said rotor shaft.

4. The rotor assembly of claim 1 wherein said baffle shell is disposed on a face of said intermediate portion of said rotor shaft.

5. The rotor assembly of claim 4 further comprising a plurality of first cooling fluid inlets defined between said baffle shell and said face, each of said first cooling fluid inlets allowing cooling fluid to be drawn from said annular space over said outer surface of said baffle shell.

6. The rotor assembly of claim 5 wherein said baffle shell defines a plurality of second cooling fluid inlets which allow fluid to be drawn from said annular space over said outer surface.

7. The rotor assembly of claim 6 further comprising at least one passageway disposed between successive end turns wherein one of said first cooling fluid inlets is disposed at a first end of said passageway, one of said second cooling fluid inlets is disposed at a second end of said passageway and at least one of said cooling fluid exhaust openings is located between said first and second ends of said passageway.

8. The rotor assembly of claim 7 wherein two of said cooling fluid exhaust openings are located between said first and second ends of said passageway.

9. The rotor assembly of claim 8 wherein one of said two cooling fluid exhaust openings is disposed adjacent to a convex portion of a corner of a first of said successive end turns and the other of said two cooling fluid exhaust openings is disposed adjacent to a concave portion of a corner of a second of said successive end turns.

10. The rotor assembly of claim 1 wherein said substantially helical exhaust duct comprises a plurality of channels, wherein each of said channels is in fluid communication with one of a plurality of axial slots defined by said intermediate portion of said rotor shaft.

11. The rotor assembly of claim 1 wherein the cross-sectional area of said substantially helical exhaust duct increases over a length of said substantially helical exhaust duct towards said intermediate portion of said rotor shaft.

12. The rotor assembly of claim 10 wherein the cross-sectional area of each of said plurality of channels increases over a length towards said intermediate portion of said rotor shaft.

13. The rotor assembly of claim 1 wherein when said rotor assembly is rotated said annular space comprises a high pressure zone and said substantially helical exhaust duct comprises a suction zone.

14. The rotor assembly of claim 7 wherein when said rotor assembly is rotated cooling fluid is drawn from said annular space into said passageway at said first and second ends and is exhausted from said passageway into said substantially helical exhaust duct via said at least one cooling fluid exhaust opening.

15. A rotor assembly comprising:
   a rotor shaft having an intermediate portion and a rotor shaft extension of a reduced diameter with respect to said intermediate portion;
   a baffle shell disposed in an annular space defined between said rotor shaft extension and a plurality of end turns of a plurality of coils of said rotor assembly, said baffle shell defining a plurality of cooling fluid exhaust openings in fluid communication with an exhaust duct disposed on or integrally formed with said baffle shell, wherein each of said cooling fluid exhaust openings is disposed between first and second ends of one of a plurality of cooling fluid passageways.

16. The rotor assembly of claim 15 wherein said baffle shell is disposed on a face of said intermediate portion of said rotor shaft.

17. The rotor assembly of claim 16 further comprising a first cooling fluid inlet defined between said baffle shell and said face, wherein said first cooling fluid inlet is in fluid communication with said annular space and said first ends of said cooling fluid passageways.

18. The rotor assembly of claim 17 further comprising a second cooling fluid inlet defined by said baffle shell, wherein said second cooling fluid inlet is in fluid communication with said annular space and said second ends of said cooling fluid passageways.

19. The rotor assembly of claim 18 wherein each of said cooling fluid exhaust openings is disposed near a corner of one of said plurality of end turns.

20. The rotor assembly of claim 19 wherein two of said cooling fluid exhaust openings are disposed between said first and second ends of each cooling fluid passageway.

21. The rotor assembly of claim 20 wherein each of said cooling fluid passageways is disposed between successive end turns and wherein, within each of said cooling fluid passageways, one of said two cooling fluid exhaust openings is disposed adjacent to a convex portion of a corner of a first of said successive end turns and the other of said two cooling fluid exhaust openings is disposed adjacent to a concave portion of a corner of a second of said successive end turns.

22. The rotor assembly of claim 15 wherein said baffle shell is substantially in the shape of a hollow cylinder.

23. The rotor assembly of claim 15 wherein said exhaust duct is substantially helical.

24. The rotor assembly of claim 15 wherein said exhaust duct is in fluid communication with an axial slot defined by said intermediate portion of said rotor shaft.

25. The rotor assembly of claim 23 wherein said exhaust duct comprises a plurality of channels, wherein each of said channels is in fluid communication with an axial slot defined by said intermediate portion of said rotor shaft.

26. The rotor assembly of claim 23 wherein the cross-sectional area of said exhaust duct increases over a length of said exhaust duct towards said intermediate portion.

27. A rotor assembly comprising:
a rotor shaft having an intermediate portion and first and second end portions of a reduced diameter with respect to said intermediate portion;
at least one axial slot defined by said intermediate portion of said rotor shaft;
a plurality of conductive coils, each of said coils comprising first and second axial members and first and second transverse members, wherein first and second end segments of each coil extend beyond the first and second ends, respectively, of said intermediate portion of said rotor shaft, and wherein each of said end segments defines first and second intersections of an axial member and a transverse member;
a first baffle shell disposed against said first end segments in a first annular space between said first reduced diameter end portion of said rotor shaft and said first end segments of said coils and a second baffle shell disposed against said second end segments in a second annular space between said second reduced diameter end portion of said rotor shaft and said second end segments of said coils,
wherein each of said first and second baffle shells has an upper surface defining a plurality of exhaust openings in fluid communication with an exhaust duct disposed on or integrally formed with said baffle shell, wherein each of said exhaust openings is disposed near one of said intersections.

28. A method for cooling a plurality of coil end turns in a rotor assembly comprising a plurality of cooling fluid passageways having first and second ends comprising the steps of:
introducing cooling fluid into each of said plurality of cooling fluid passageways via said first and second ends; and
exhausting spent cooling fluid from said plurality of cooling fluid passageways using a plurality of exhaust openings wherein at least one of said plurality of exhaust openings is disposed between said first and second ends of each of said plurality of cooling fluid passageways.

29. The method of claim 28 further comprising the step of:
employing an exhaust duct having at least one substantially helical dimension to collect said spent cooling fluid from said plurality of exhaust openings.

30. The method of claim 28 wherein each of said cooling fluid passageways is disposed between successive ones of said coil end turns and wherein, within each of said plurality of cooling fluid passageways, a first exhaust opening is disposed adjacent to a convex portion of a corner of a first of said successive coil end turns and a second exhaust opening is disposed adjacent to a concave portion of a corner of a second of said successive coil end turns.

31. The method of claim 28 further comprising the step of:
employing a baffle shell to collect said spent cooling fluid from said plurality of exhaust openings, wherein said baffle shell comprises a plurality of layers wherein an outer layer of said plurality of layers defines said plurality of exhaust openings and said plurality of exhaust openings are in fluid communication with an exhaust duct defined by an inner layer of said plurality of layers of said baffle shell.

* * * * *